(12) United States Patent
Mitamura et al.

(10) Patent No.: US 6,655,940 B2
(45) Date of Patent: Dec. 2, 2003

(54) CENTER MECHANISM OF TIRE PRESS AND TIRE PRESS

(75) Inventors: Hisashi Mitamura, Takasago (JP);
Yasuhiko Fujieda, Takasago (JP);
Kazuto Okada, Kobe (JP); Hirohiko Fukumoto, Kobe (JP); Akira Sakurai, Kobe (JP)

(73) Assignee: Kobe Steel, Ltd., Kobe (JP)

( * ) Notice: Subject to any disclaimer, the term of this patent is extended or adjusted under 35 U.S.C. 154(b) by 196 days.

(21) Appl. No.: 09/903,746

(22) Filed: Jul. 13, 2001

(65) Prior Publication Data

US 2002/0015747 A1 Feb. 7, 2002

(30) Foreign Application Priority Data

Jul. 13, 2000 (JP) ........................................ 2000-212195

(51) Int. Cl.[7] .............................................. B29C 35/02
(52) U.S. Cl. ........................................... 425/40; 425/42
(58) Field of Search .............................. 425/40, 42, 43, 425/48

(56) References Cited

U.S. PATENT DOCUMENTS

| 3,770,858 | A | | 11/1973 | Ireland et al. |
| 4,123,306 | A | | 10/1978 | Landry |
| 4,208,562 | A | | 6/1980 | Perreault |
| 5,622,669 | A | * | 4/1997 | Dailliez et al. ............... 425/41 |
| 5,683,643 | A | * | 11/1997 | Laurent ....................... 425/42 |

FOREIGN PATENT DOCUMENTS

| FR | 2562833 | 10/1985 |
| GB | 2157224 | 10/1985 |
| JP | 59114042 | 6/1984 |
| JP | 09123172 | 5/1997 |

* cited by examiner

Primary Examiner—James P. Mackey
(74) Attorney, Agent, or Firm—Oblon, Spivak, McClelland, Maier & Neustadt, P.C.

(57) ABSTRACT

A tire press comprising a center post 22 vertically movably extended through a center part of a lower ring mechanism 12 and vertically moving an upper ring 19 with respect to a lower ring mechanism 12, a heater 103 arranged in an outer peripheral position of the center post 22 on the tire inner peripheral side of a green tire 4 held by the lower ring mechanism 12 and the upper ring 19, heater 103 to apply a heat to the green tire 4, a first driving mechanism such as a tubular member vertically moving cylinder 98 capable of vertically moving the heater 103 to a suitable height position so as to move the heater 103 to a suitable position independently of vertical movement of the center post 22, and a second driving mechanism such as a driving motor 99 capable of rotating the heater 103. By the provision of such a mechanism as described, press molding relative to a green tire 4 can be completed in a sufficiently short period of time.

14 Claims, 9 Drawing Sheets

CENTER MECHANISM OF TIRE PRESS AND TIRE PRESS

BACKGROUND OF THE INVENTION

1. Field of the Invention

The present invention relates to a center mechanism vertically moving an upper ring with respect to a lower ring of a tire press and a tire press using the same.

2. Description of the Related Art

In the past, green tires molded by a molding machine are stored under the environment of room temperature in a rack of a predetermined storage places, afterward, are taken out of the rack on the basis of a production plan, and are carried into a press. In this case, for example, in a bladder type press, the green tire is charged into a mold by clamping a mold, and afterward, a pressure medium of high temperature and high pressure is supplied into a bladder inserted into a tire hole whereby the bladder is extended into close contact with the inner wall surface of a tire. Then, the inner wall surface of a tire is pressed in a direction of a mold while heating the inner wall surface of a tire though the bladder to thereby form a tire groove of a mold in a tread part of the green tire. Further, the green tire is heated from outside and inside by a mold heated and a bladder in contact with the pressure medium of high temperature to rise a temperature of the green tire to a press starting temperature (100° C. to 120° C. or higher) quickly whereby press molding is completed in a short period of time.

In the above-described prior art, the outside and the inside of the green tire are heated by the mold and the bladder so as to complete the press molding in a short period of time. However, since the green tire is mainly constituted from rubber having a low heat conductivity, even if the surface side of the green tire should be risen in temperature in a short period of time, a rise in temperature of the internal side is delayed, and particularly, the delay in rise of temperature of the internal center in a tread wall-thickness part having a large thickness or a bead part is conspicuous. Accordingly, even in a case where pressing of the surface portion of the green tire is completed, it is necessary to continue press molding till pressing of the inside in which a rise in temperature to a press temperature is delayed, thus posing a problem that press molding cannot be completed in a short period of time sufficiently.

It is therefore an object of the present invention to provide a center mechanism of a tire press capable of completing press molding in a short period of time.

SUMMARY OF THE INVENTON

For achieving the above-described object, the present invention provides a center mechanism of a tire press comprising: a lower ring, an upper ring, a center post, said center post being extended vertically movably through a center part of said lower ring to vertically move said upper ring with respect to said lower ring, heating means, and moving means capable of moving said heating means to a suitable position independently of vertical movement of said center post, wherein said heating means may be arranged, when a tire is held between said lower ring and said upper ring, in the position capable of heating the inside of the tire.

According to the above-described constitution, the heating means is moved so as to principally apply the heat to the wall-thickness part of the green tire whereby the wall-thickness part can be risen in temperature rapidly. Thereby, the whole green tire can be risen in temperature to a press temperature in a shorter period of time than a case where a heating medium such as high temperature vapor is supplied to the inner peripheral side of a tire of the green tire, and the whole green tire is heated with uniform heat by the heating medium alone. Accordingly, press molding can be completed in a short period of time. Further, if a great heat is released from said heating means, press molding can be carried out with that heat, thus being unnecessary to supply a high temperature heating medium. As a consequence, costs required for a device for supplying a heating medium can be reduced.

The center mechanism of the tire press according to the present invention comprises a tubular member movably fitted over the center post, and the heating means is mounted on the tubular member. The heating means can be a heater provided to be wound around a partial region of the tubular member. Further, the moving means may comprise a first driving mechanism for vertically moving the tubular member.

According to the above-described constitution, the heater can be mounted easily on the tubular member, and by the simple constitution of the first driving means, the tubular member is vertically moved to a suitable height position to thereby cause the heater to come close to the wall-thickness part of the green tire to principally heat the wall-thickness part.

In the center mechanism of the tire press according to the present invention, the moving means further comprises a second driving mechanism for rotating the tubular member about the center post.

According to the above-described constitution, since heat generating means is turned about the center post by rotation of the tubular member, even if the heat generating member is provide in a part in the peripheral direction of a mounting region or heat-generated in a peripherally uneven state, the heat can be applied uniformly to the whole green tire in the peripheral direction.

Further, in the center mechanism of the tire press according to the present invention, the heating means can be a directional lamp set so as to emit light in a predetermined direction to apply the heat.

Further, the present invention provides a tire press comprising a mold, mold heating means for heating the mold, in which a green tire is mounted within the mold by clamping the mold when subjected to press-processing, a bladder, means for supplying a heating medium into the bladder, and the center mechanism described above. When a green tire is press-processed, the bladder is placed in close contact with the inner wall surface of the green tire.

According to the above-described constitution, added to means for supplying a heating medium such as high temperature vapor to the inner peripheral side of the green tire and heating the whole green tire with uniform heat by the heating medium is heating means for principally applying the heat to a portion that is hard to be risen in temperature such as the wall-thickness part, whereby the whole green tire can be risen in temperature to a pressing temperature in a short period of time.

The tire press according to the present invention may further comprise a high frequency power source, and a heating coil supplied with power from the high frequency power source.

According to the above-described constitution, it is possible to further increase the heat applied to a portion that is hard to be risen in temperature such as a wall-thickness part, and is further possible to rise a temperature of the whole green tire to a pressing temperature in a short period of time.

DESCRIPTION OF THE PREFERRED EMBODIMENTS

The preferred embodiments of the present invention will be descried hereinafter with reference to FIGS. 1 to 9.

Figure 2:
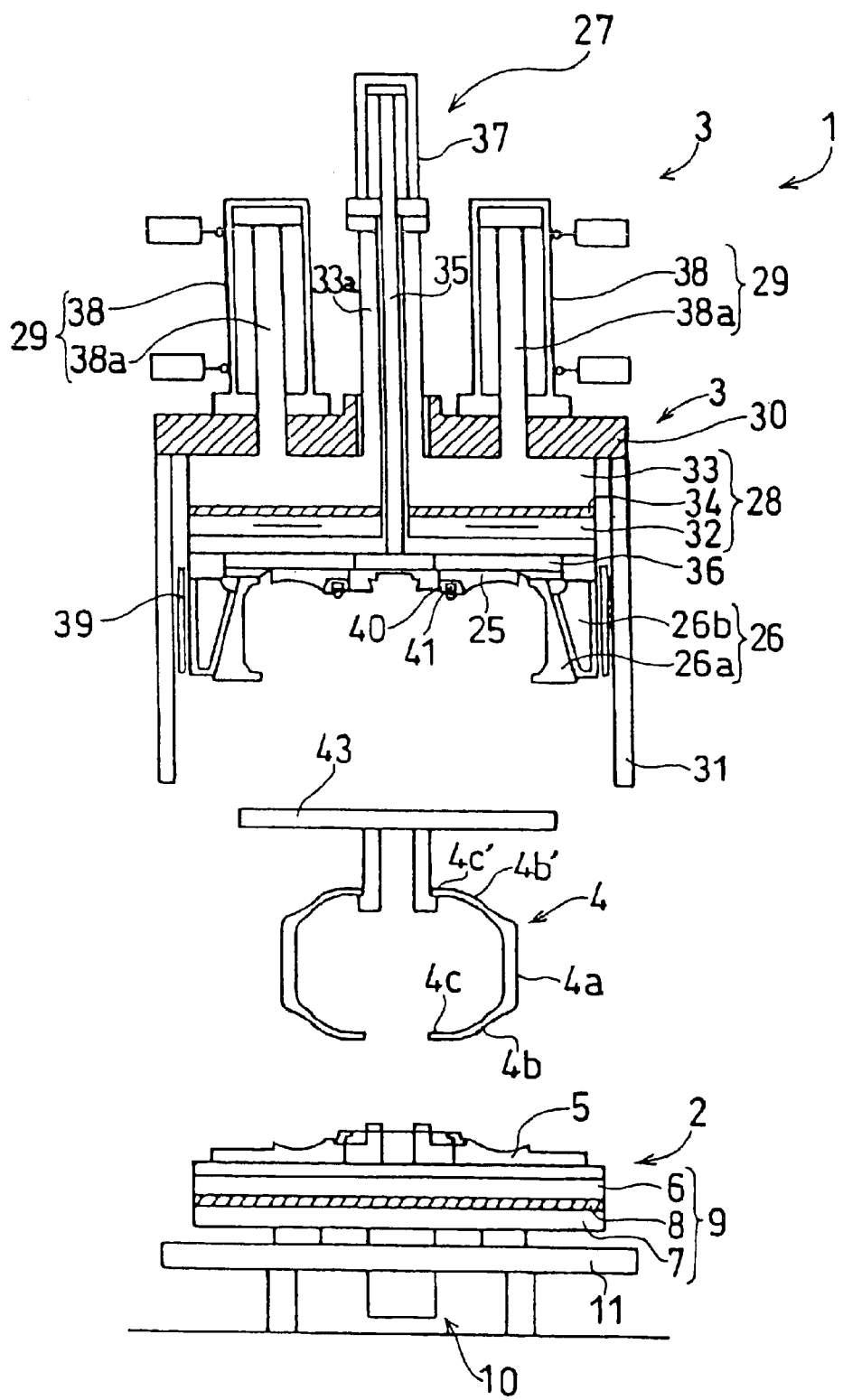
FIG. 2 is an explanatory view showing a state of carrying in a green tire.

A press according to the present embodiment comprises, as shown in FIG. 2, a mold fixing part 2 set to a predetermined height position, and a mold vertically moving part 3 for vertically moving with respect to the mold fixing part 2. The mold fixing part 2 has a lower side mold 5 in contact with a lower side wall 4b of a green tire 4, a lower heating mechanism 9 for heating the lower side mold 5 to a predetermined temperature, a center mechanism 10 extending through a center part of a lower heating mechanism 9 and the lower side mold 5, and a base frame 11 for supporting the center mechanism 10 and the lower heating mechanism 9.

Figure 6:
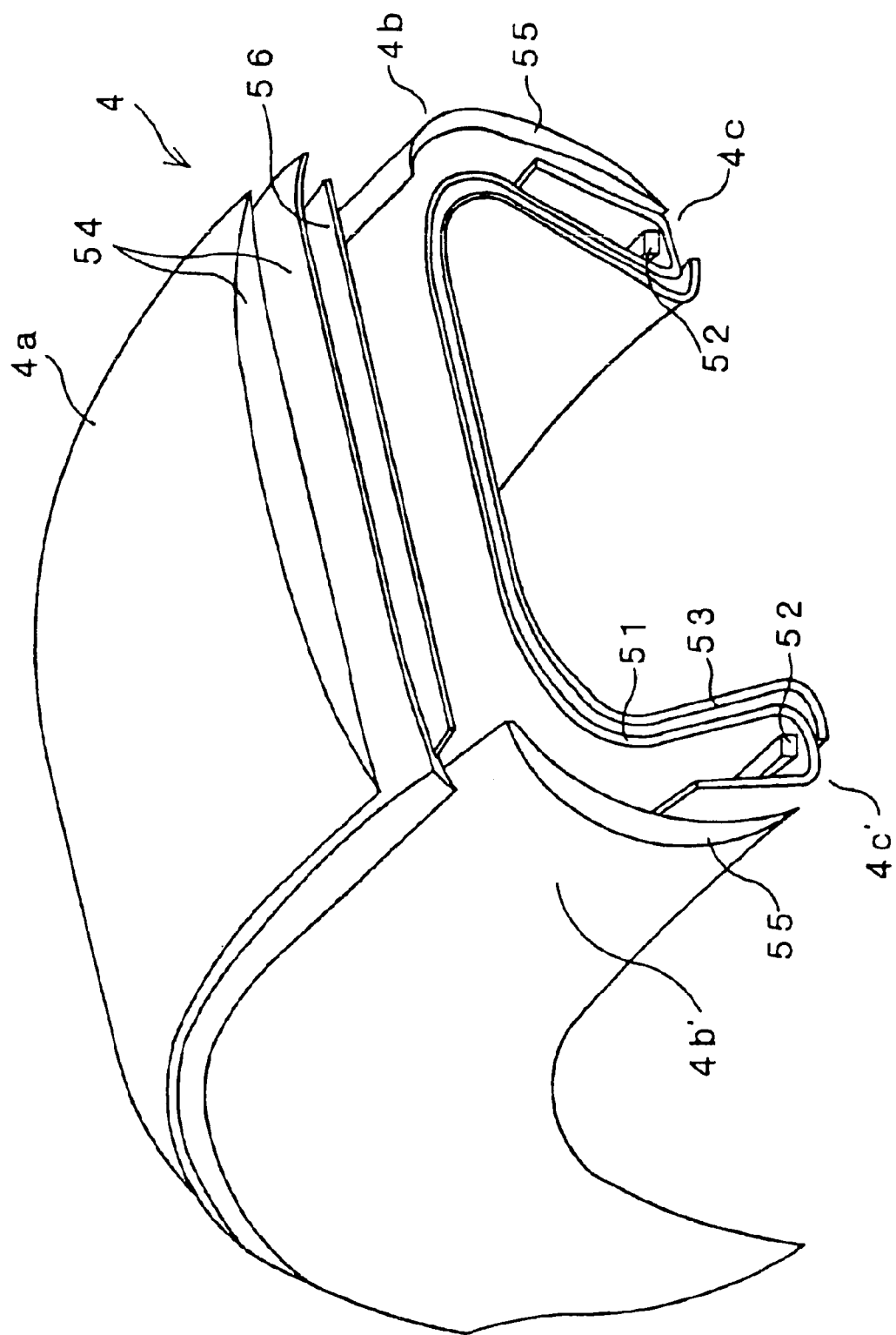
FIG. 6 is an exploded perspective view showing a main part of a green tire.

The green tire 4 has, as shown in FIG. 6, a carcass assembly 51 having both ends bended, a bead wire 52 made of metal provided in the bended part of the carcass assembly 51, an inner liner 53 made of rubber attached to the inner peripheral surface of the carcass assembly 51, a tread member 54 and a side wall member 55 made of rubber respectively attached to the outer peripheral surface and the side peripheral surface of the carcass assembly 51, and a belt member 56 made of metal provided between the tread member 54 and the carcass assembly 51, whereby the tire inside of a tread part 4a and bead parts 4c, 4c' having a large wall-thickness has metal members (the bead wire 52 and the belt member 56).

As shown in FIG. 2, the lower heating mechanism 9 of the mold fixing part 2 has a disk-shaped lower platen 6 for supporting the lower side mold 5 in a face-like manner. The lower platen 6 has an internal space to which high temperature vapor is supplied. Heat is generated by the vapor supplied to the internal space to heat the lower side mold 5 in a face-like manner. Further, the lower heating mechanism 9 has a platen support 7 for supporting a lower platen 6, and a heat insulating plate 8 interposed between the lower platen 6 and the platen support 7 so as not to transmit heat of the lower platen 6 to the platen support 7.

Figure 3:
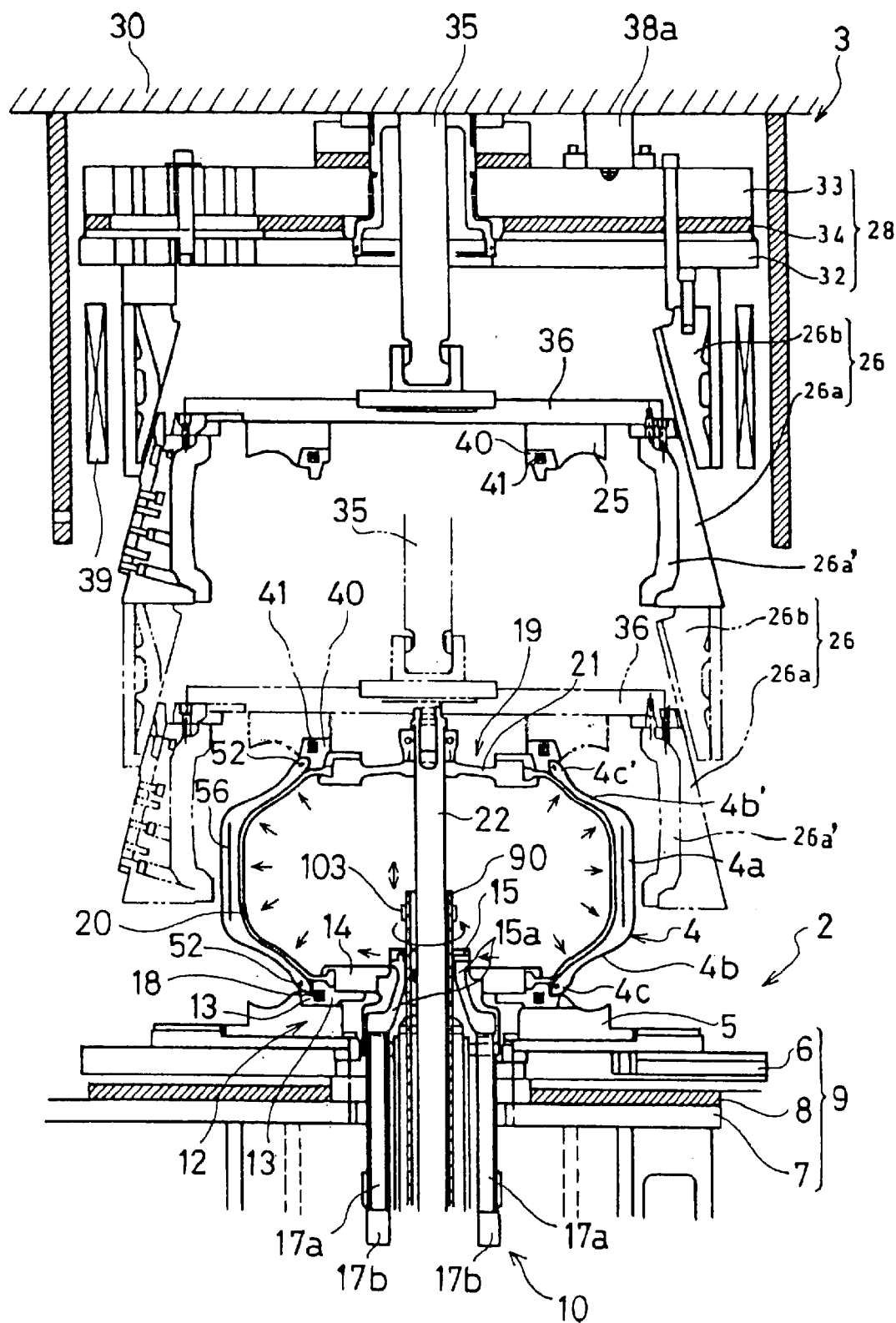
FIG. 3 is an explanatory view showing a clamping state.

Further, the center mechanism 10 extending through the center part of the lower heating mechanism 9 has a lower ring mechanism 12 secured to the lower side mold 5, as shown in FIG. 3. The lower ring mechanism 12 has a lower bead ring 13 so formed as to come in contact with the lower bead part 4c of the green tire 4, a lower bladder ring 14 provided on the upper surface of the lower bead ring 13 to hold the lower edge part of the bladder 20 in cooperation with the lower bead ring 13, and a clamp ring hub 15 provided on the inner peripheral side of the lower bladder ring 14. The clamp ring hub 15 is internally formed with supply and discharge passages 15a, 15a for causing pressure medium such as vapor or nitrogen gas to flow. These supply and discharge passages 15a, 15a are communicated from the upper end surface to the lower end surface, and the supply and discharge passages 15a, 15a at the lower end are connected to a pressure and heating medium supply device not shown through pipes 17a, 17a.

Further, the lower bead ring 13 is internally provided with an annular first induction heating coil 18. To the first induction heating coil 18 is connected a high frequency power source 24, shown in FIG. 5 for supplying high frequency power. The first induction heating coil 18 applies a strong high frequency magnetic field to the lower bead part 4c of the green tire 4 by a supply of high frequency power to preferentially induction-heat the bead wire 52 of the lower bead part 4c.

In the center part of the lower ring mechanism 12 constituted as described above, a center post 22 for vertically moving the upper ring 19 with respect to the lower ring mechanism 12 and a first cylindrical member 90 inserted over the center post 22 are stood upright in an air-tight state. The center post 22 and the first cylindrical member 90 are movable vertically independently of each other. An upper ring 19 is provided on the upper end of the center post 22. The upper ring 19 has an upper bladder ring 21, and the upper bladder ring 21 holds an upper edge part of the bladder 20.

Figure 1:
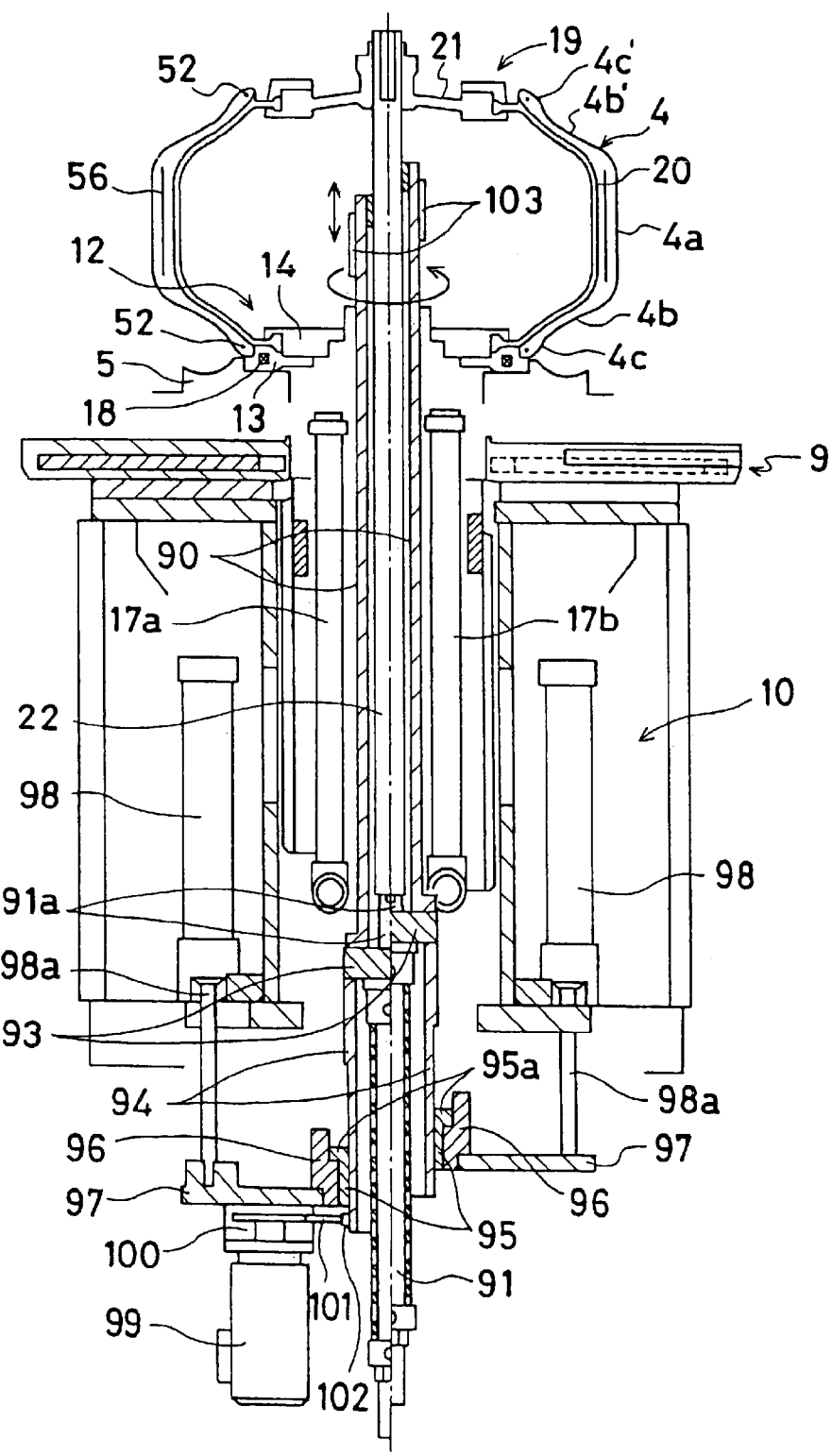
FIG. 1 is an explanatory view showing an operating state of a center mechanism.

On the other hand, the lower end of the center post 22 is connected to a cylinder rod 91a of a post vertically moving cylinder 91, as shown in FIG. 1. In the post vertically moving cylinder 91, the shaft center of the cylinder rod 91a coincides with that of the center post 22, and the center post 22 can be vertically moved in a suitably height position by adjusting the moving amount of the cylinder rod 91a. Further, a disk-shaped cylinder support member 93 is provided on the upper end of the post vertically moving cylinder 91. The cylinder support member 93 has the diameter larger than the outside diameter of the post vertically moving cylinder 91, and a second cylindrical member 94 having the post vertically moving cylinder 91 inserted therein is provided in the lower peripheral edge of the cylinder support member 93.

The second cylindrical member 94 and the first cylindrical member 90 constitute a tubular member, and a first driving mechanism capable of vertically moving the tubular member to a suitable height position and a second driving mechanism capable of rotating the tubular member about the center post 22 are connected to the lower peripheral surface (a driving region of the tubular member) of the second tubular member 94.

The first driving mechanism has a first engaging member 95 fixedly mounted on the lower outer peripheral surface of the second cylindrical member 94 and formed at the upper part with a projecting part 95a, a second engaging member 96 in contact with the projecting part 95a to thereby rotatably support the first engaging member 95, a support plate 97 for supporting the second engaging member 96, and a tubular member vertically moving cylinder 98 arranged symmetrically to left and right about the post vertically moving cylinder 91 and having a cylinder rod 98a connected to the upper surface of the support plate 97. In the first driving mechanism constituted as described above, the tubular member vertically moving cylinder 98 adjusts the moving amount of the cylinder rod 98a whereby the tubular members (the first cylindrical member 90, the second cylindrical member 94) can be vertically moved to a suitable position through the members 93 to 97.

On the other hand, the second driving mechanism has a driving motor 99 provided on the lower surface of the support plate 97, a first sprocket 100 provided on a rotational shaft of the driving motor 99, a second sprocket 102 provided in the lower outer peripheral surface of the second cylindrical member 94, and a chain 101 extended between both the sprockets 100 and 102. In the second driving mechanism constituted as described above, the driving motor 99 is rotated whereby the tubular members (the first cylindrical member 90 and the second cylindrical member 94) can be rotated through the chain 101 or the like.

The first driving mechanism and the second driving mechanism constituted as described above constitute a main part of a moving mechanism capable of moving the tubular members (the first cylindrical member 90 and the second cylindrical member 94) to a suitable position independently of the vertical movement of the center post 22. The mounting region positioned between the upper ring 19 and the lower ring 12 is set to the first cylindrical member 90 moved vertically by the moving mechanism, and in the mounting region is provided a heater 103 wound around the whole periphery. The heater 103 is connected to a heater power source not shown, and heat is generated by a supply of power from the heater power source to heat a pressure medium such as vapor or nitrogen gas filled in the bladder 20 and to heat the bladder 20 directly.

The bladder 20 presses the tire inner wall surface in a mold direction by being supplied with the pressure medium when the green tire 4 is press-molded, and has a low extending material that is hard to be altered under the high temperature environment as a constituent member. The low extending material is formed to have substantially the same shape as the tire inner wall surface shape when the green tire 4 is press-molded into a pressed tire. That is, the bladder 20 shown in FIG. 5 employs the low extending material that is hard to be altered under the high temperature environment and formed to have substantially the same shape as the tire inner wall surface shape of the pressed green tire.

The above-described low extending material is a material having a smaller elongation percentage than a conventional rubber for a bladder (for example, butyl rubber) under the high temperature environment of a press temperature, and particularly, preferably, the elongation percentage under the high temperature environment at 200° C. is in the range of from 5% to 15%. The reason why the above range of the elongation percentage is preferable is that in the range less than 5%, the force for pressing the whole green tire 4 uniformly at the time of press molding lowers resulting in insufficient moldability, and in the range in excess of 15%, it is difficult to press-mold the green tire 4 with high accuracy similar to the conventional rubber for a bladder (for example, butyl rubber).

As low extending materials that are hard to be altered under the high temperature environment, there can be employed knitting or fabrics using fibers such as nylon or alamide in addition to polyester, or mesh metal, high density fibers, carbon-contained fibers, metal covered fibers, resin covered fibers, etc., and those having not less than one out of these materials mixed can be employed. Forms of mixtures include, for example, that mesh metal is laminated on a polyester film, a laminated construction having a metal film evaporated on a polyester film, or that metal covered fiber and high density fiber are woven evenly or unevenly. Further, there is a form that in order to provide air-tightness, resin such as fluorine or silicone and at least one kind of elastomer are impregnated or coated on the knitting or fabrics. These forms are suitably selected according to the design specification of a bladder (presence or absence of heat generation caused by induction heating or strength).

A mold vertically moving part 3 is provided upwardly of the bladder 20, as shown in FIG. 2. The mold vertically moving part 3 has an upper side mold 25 in contact with an upper side wall 4b' of the green tire 4, a split mold 26 positioned in an outer peripheral direction of a tread part 4a of the green tire 4, a first mold vertically moving part 27 for vertically moving a slide segment 26a of the split mold 26 and the upper side mold 25, an upper heating mechanism 28 for heating the upper side mold 25 to a predetermined temperature, a second mold vertically moving mechanism 29 for vertically moving a fixed ring 26b the split mold 26 and the upper heating mechanism 28, and a support member 30 for supporting these mechanisms 27 to 29.

The upper heating mechanism 28 has a disk-shaped upper platen 32. The upper platen 32 has an internal space to which high temperature vapor is supplied, and heat is generated by vapor supplied to the internal space to heat the upper side mold 25 in a face-like manner. Further, the upper heating mechanism 28 has a platen support 33 for supporting the upper platen, and a heat insulating plate 34 interposed between the upper platen 32 and the platen support 33 so as not to transmit heat of the upper platen 32 to the platen support 33.

Figure 5:
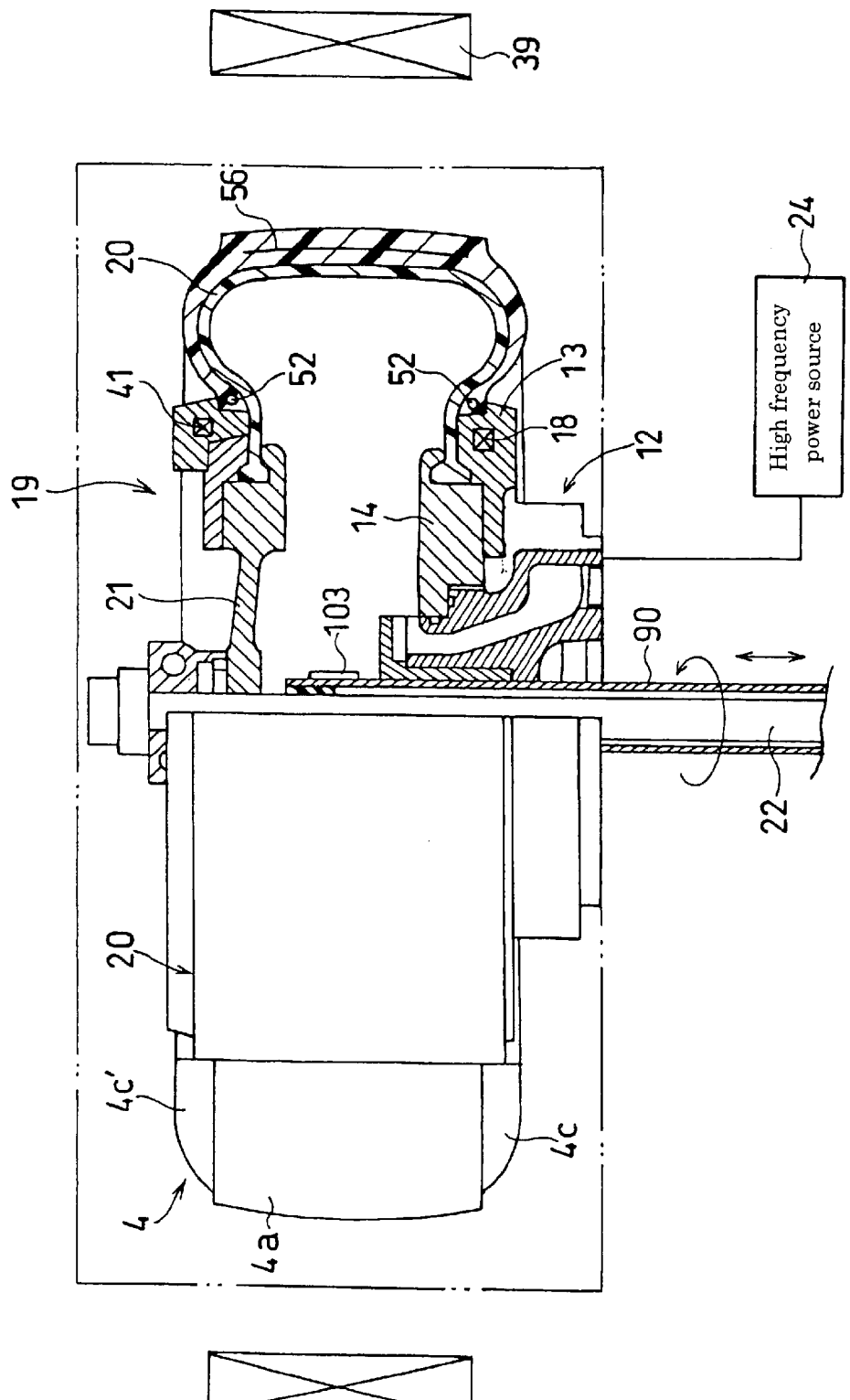
FIG. 5 is an explanatory view showing a state of carrying out press molding.

A rod-like member 35 of the first mold vertically moving mechanism 27 is inserted vertically movably into the center part of the upper heating mechanism 28. A disk-shaped slide plate 36 is provided on the lower end of the rod-like member 35. The upper side mold 25 is fixedly mounted on the center side in the center part of the lower surface of the slide plate 36. An upper bead ring 40 formed so as to come in contact with an upper bead part 4c' of the green tire 4 is provided in the inner peripheral part of the upper side mold 25. An annular third induction heating coil 41 is provided internally of the upper bead ring 40. A high frequency power source 24 shown in FIG. 5 is connected to the third induction heating coil 41, the third induction heating coil 41 preferentially induction-heating, by applying a strong high frequency magnetic field to an upper bead part 4c' of the green tire 4 caused by a supply of high frequency power, a bead wire 52 of the upper bead part 4c'.

A plurality of slide segments 26a formed of a non-magnetic material such as aluminum or stainless steel or synthetic resin are provided in the outer peripheral part of the lower surface of the slide plate 36. Each of the slide segments 26a is provided with a tread mold 26a' formed so as to come in contact with the tread part 4a of the green tire 4, which are arranged at equal intervals on the concentric circle about the upper side mold 25 and engaged with the slide plate 36 movably in the center direction. A fixed ring 26b formed of non-magnetic material is arranged in the outer direction of these slide segments 26a. The fixed ring 26b is fixedly mounted on the peripheral edge part of the lower surface of the upper platen 32 so as to radially backwardly move the slide segments 26a while engaging the outer surfaces of the slide segments 26a. The tread molds 26a' of the slide segments 26a form, when moved in the center direction by the fixed ring 26b, a tubular mold corresponding to the tread part 4a of the green tire 4.

On the other hand, the upper end part of the rod-like member 35 is connected to a first cylinder member 37. The first cylinder member 37 is supported by an insert part 33a stood upright from the center part of the upper surface of the platen support 33. Thereby, the first mold vertically moving mechanism 27 having the first cylinder member 37 or the like causes the slide plate 36 (the upper side mold 25, the slide segment 26a) to enable vertical movement independently of the support member 30 and the heating mechanism 28 through the rod-like member 35.

In the insert part 33a supporting the first cylinder member 37, the rod-like member 35 is inserted movably, and is inserted movably in the support member 30. A pair of left and right second mold vertically moving mechanisms 29 are arranged on both sides of the insert part 33a. Each of the second mold vertically moving mechanisms 29 has a second cylinder member 38 fixedly mounted on the upper surface of the support member 30, and in the second cylinder member 38, an extreme end of a cylinder rod 38a is connected to the platen support 33 so as to move vertically the upper heating mechanism 28.

A tubular shield member 31 stood down from the peripheral edge part of the support member 30 is arranged in the outer peripheral direction of the upper heating mechanism 28 and the split mold 26 constituted as described above. Further, a fourth induction heating coil 39 is provided between the shield member 31 and the split mold 26. A high frequency power source 24 shown in FIG. 5 is connected to the fourth induction heating coil 39, and the fourth induction heating coil 39 applies a strong high frequency magnetic field to the tread part 4a of the green tire 4 by a supply of high frequency power to thereby preferentially induction-heat the belt member 56 of the tread part 4a.

In the above-described constitution, a press molding method will be described through the operation of the press 1.

First, as shown in FIG. 2, the mold vertically moving part 3 is moved upward to thereby position the mold vertically moving part 3 upwardly of the mold fixed part 2. Afterward, the green tire 4 is carried to and between the mold fixed part 2 and the mold vertically moving part 3 by a carrier device 43. When the tire hole of the green tire 4 is positioned upwardly of the center post 22, the center post 22 of the center mechanism 10 is moved upward, as shown in FIG. 3, whereby the upper edge part of the bladder 20 is raised through the upper ring 19 to reduce the bladder 20 in diameter smaller than the tire hole of the green tire 4. Then, the green tire 4 is moved downward to place the green tire 4 on the lower side mold 5 while inserting the center post 22 and the bladder 20 into the tire hole of the green tire 4.

Figure 4:
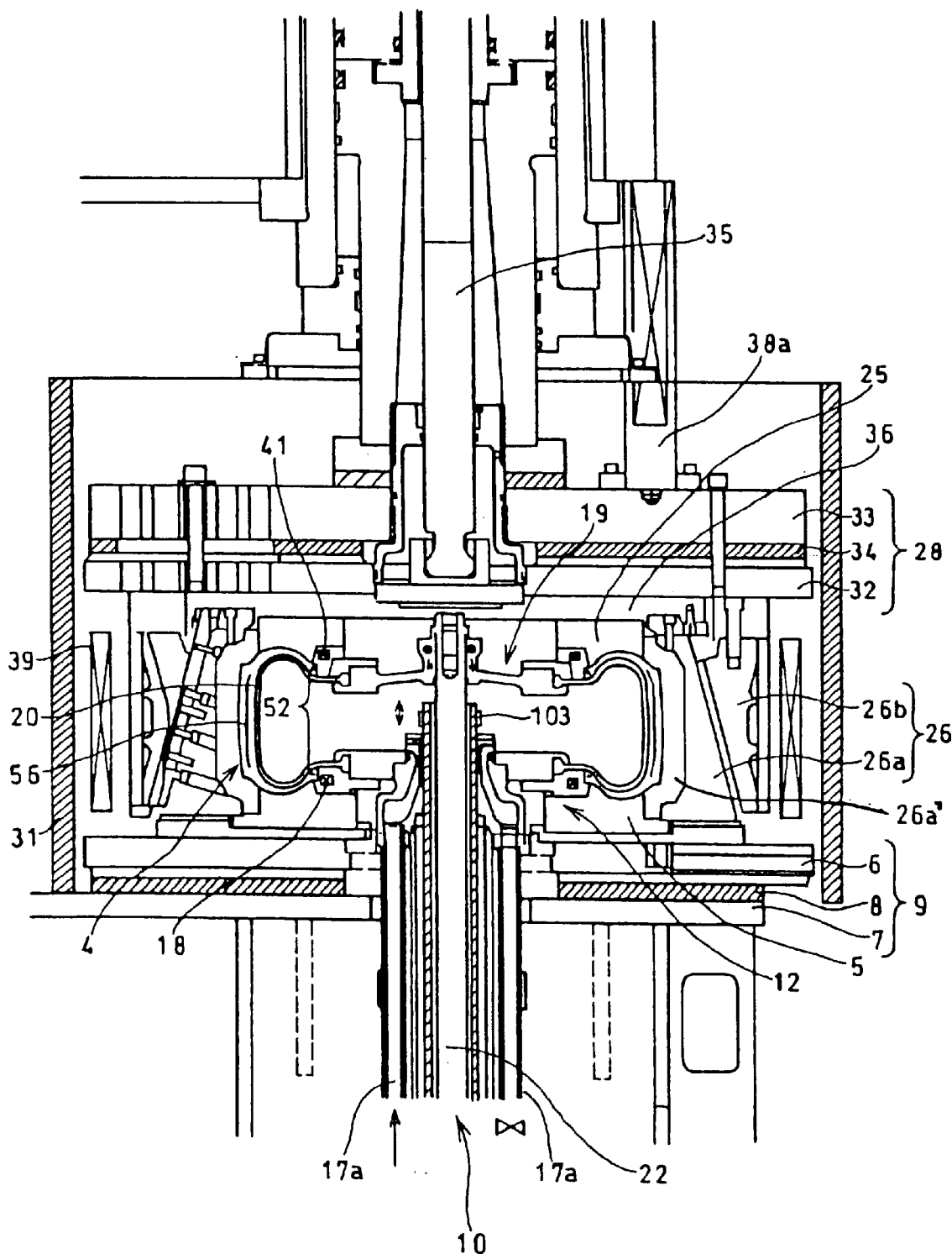
FIG. 4 is an explanatory view showing a clamped state.

Next, the rod-like member 35 is moved forward from the first cylinder member 37, whereby the slide plate 36 is moved downward and separated, and the slide segment 26a is moved in the outer peripheral direction. Thereafter, as shown in dash-dotted contour lines, the mold vertically moving part 3 is moved downward while maintaining the separated state of the upper heating mechanism 28 and the slide plate 36, the green tire 4 is positioned on the inner peripheral side of the slide segment 26a, and thereafter, the slide segment 26a is moved in the center direction by the fixed ring 26b. Then, as shown in FIG. 4, the slide segments 26a are placed in contact with each other to form a tubular mold corresponding to the tread part 4a of the green tire 4, and the upper side mold 25 and the lower side mold 5 are respectively placed in contact with the upper part and the lower part of the mold to thereby place the mold in a totally closed state. Then, the mold vertically moving part 3 and the mold fixed part 2 are locked by a lock holding mechanism not shown, after which the cylinder rod 38a is moved forward from the second cylinder member 38 to complete clamping of the mold.

The heating medium such as high temperature vapor is supplied to the upper platen 32, the lower platen 6. The fixed segment 26b of the split mold, the upper and lower side molds 25, 5 are heated by both the platens 6, 32, and the slide segment 26a of the split mold are generated in heat to thereby heat the green tire 4 surrounded by these molds 25, 5, 26a' from the outer surface side. Further, the heating medium such as high-temperature high-pressure vapor or nitrogen gas is supplied through a pipe 17a into the bladder 20 to thereby move forward the bladder 20 into close contact with the inner wall surface of the green tire 4 to press the green tire 4 in the mold direction. Then, the heat of the heating medium of high-temperature high-pressure is transmitted to the green tire 4 through the bladder 20 to thereby heat the green tire 4 from the inner surface side.

Further, as shown in FIG. 5, high frequency power is supplied to the respective heating coils 18, 41, 39 from the high frequency power source 24. The first induction heating coil 18 and the third induction heating coil 41 supplied with high frequency power preferentially induction-heat the bead wire 52, 52 provided internally of both the bead parts 4c, 4c' by applying strong high frequency magnetic field to the lower bead part 4c and the upper bead part 4c' of the green tire 4. Further, since the split mold 26 is formed of a non-magnetic material and divided in a circumferential direction, the fourth induction heating coil 39 preferentially induction-heats the belt member 56 provided internally of the tread part 4a by applying strong high frequency magnetic field to the tread part 4a of the green tire 4. Thereby, the green tire 4 is heated from the outer surface side and the inner surface side, and in addition, in the bead parts 4c, 4c' and the tread part 4a having a large wall-thickness, the green tire 4 is heated also from the inside of the tire, and therefore, the whole tire is risen in temperature to a press temperature in a short period of time.

Further, as shown in FIG. 1, the tubular member vertically moving cylinder 98 of the first driving mechanism adjusts the amount of forward movement of the cylinder rod 98a. The first cylindrical member 90 is vertically moved through the support plate 97, the second engaging member 96, the first engaging member 95, the second cylindrical member 94, and the cylinder support member 93 to thereby set the heater 103 to a height position to which the heat is applied to the wall-thickness part of the green tire 4 (for example, the tread part 4a) most efficiently. Thereafter, power is supplied to the heater 103 to generate heat in the heater 103 to heat the pressure medium in the bladder 20, and heat the bladder 20 directly. Thereby, the heat of the pressure medium and the heat of the heater 103 are applied to the bladder 20 to rise a temperature of the bladder 20 early to heat the green tire 4, and therefore, the green tire 4 is risen in temperature to a pressing temperature in a further short period of time. Particularly, since a height position of the heater 103 is set to a position corresponding to the tread part 4a, a rise in temperature at the tread part 4a of the green tire 4 is conspicuous.

Further, when heating by the heater 103 starts, the driving motor 99 of the second driving mechanism is operated to thereby rotate the heater 103 through the chain 101, the second cylindrical member 94, and the first cylindrical member 90. Thereby, even a case where the heater 103 is in an uneven heat generation state in a peripheral direction, even amount of heat is applied to the entirety of the bladder 20 and the green tire 4, and therefore, no peripheral unevenness of the temperature in the green tire 4 occurs.

Further, while the green tire 4 is subjected to press molding, the bladder 20 molds the green tire 4 by pressing the green tire 4 in the mold direction. At this time, since the bladder 20 is formed of a low extending material having substantially the same shape as the shape of the inner wall surface of the pressed tire, even if pressure of the pressure medium is varied somewhat, the shape of the inner wall surface of the pressed tire can be provided. Accordingly, when the green tire 4 is pressed by the bladder 20 to carry out molding, the pressed tire molded with high accuracy is obtained.

When the pressed tire is obtained in a manner as descried above, as shown in FIG. 2, the mold is opened by the operation reversed to that mentioned above, after which the bladder 20 is contracted, and the pressed tire is held by the carry-out device and carried outside. Thereafter, a new green tire 4 is carried in to repeat press molding. Even a case where such press molding is repeated, since the low extending material of the bladder 20 is hard to be altered under the high temperature environment, the low extending material maintains its initial property. Accordingly, even the stage of increasing repeating times of press molding, the bladder 20 positively provides the shape of the inner wall surface of the pressed tire whereby the bladder 20 can be used for a long period of time.

As described above, the center mechanism 10 according to the present embodiment has, as shown in FIG. 1, a center post 22 vertically movably extending through a center part of a lower ring mechanism 12 and vertically moving an upper ring 19 with respect to a lower ring mechanism 12, a heater 103 (heat generation means) to heat the green tire 4 arranged in the outer peripheral position of the center post 22 on the inner peripheral side of the green tire 4 held by the lower ring mechanism 12 and the upper ring 19, and a moving mechanism capable of moving the heater 103 to a suitable position independently of vertical movement of the center post 22.

More concretely, the moving mechanism has a tubular member (a first cylindrical member 90, a second cylindrical member 94) and a first driving mechanism. The tubular member is movably inserted over the center post 22. An upper mounting region of the tubular member is positioned between the upper ring 19 and the lower ring mechanism 12, and a lower driving region of the tubular member is positioned downward of the lower ring mechanism 12. The first driving mechanism is connected to a driving region of the tubular member, and comprises a tubular member vertically moving cylinder 98 capable of vertically moving the tubular member to a suitable height position. The heater 103 is provided to be wound about the whole periphery of the mounting region of the tubular member. While the center mechanism 10 of the present embodiment is described of a case applied to the bladder type press 1 for heating the green tire 4 through the bladder 20, it is noted that it can be also applied to the bladderless press 1.

According to the above-described constitution, since the heater 103 can be moved vertically by the first driving mechanism to a suitable height position, the heater 103 can be moved so as to principally apply the heat to the wall-thickness part of he tread part 4a of the green tire 4. Accordingly, the whole green tire 4 can be risen in temperature to a pressing temperature in a shorter period of time than a case where the high-temperature pressure medium such as vapor is supplied to the inner peripheral side of the green tire 4 to heat the whole green tire 4 merely by the pressure medium to carry out press molding, thus enabling completion of the press molding in a short period of time.

Further, in the present embodiment, there is also provided the second driving mechanism capable of rotating the tubular member about the center post 22. Thereby, even if the heat generating state of the heater 103 is uneven in the peripheral direction, the whole peripheral direction of the green tire 4 can be heated evenly.

While in the present embodiment, the heater 103 is provided to be wound around the whole periphery of the tubular member (the whole peripheral direction), it is noted that if the moving mechanism has the second driving mechanism, even the heater 103 is provided at a part in the peripheral direction, the whole peripheral direction of the green tire 4 can be heated evenly. In this case, various heat generating equipment (heat generation means) such as a heat generating lamp in addition to the heater 103 can be used.

Further, while in the present invention, a description is made of a case where the heater 103 is used as heat generation means, it is noted that the heat generation means is not limited thereto, but the following constitution may be employed.

Figure 7:
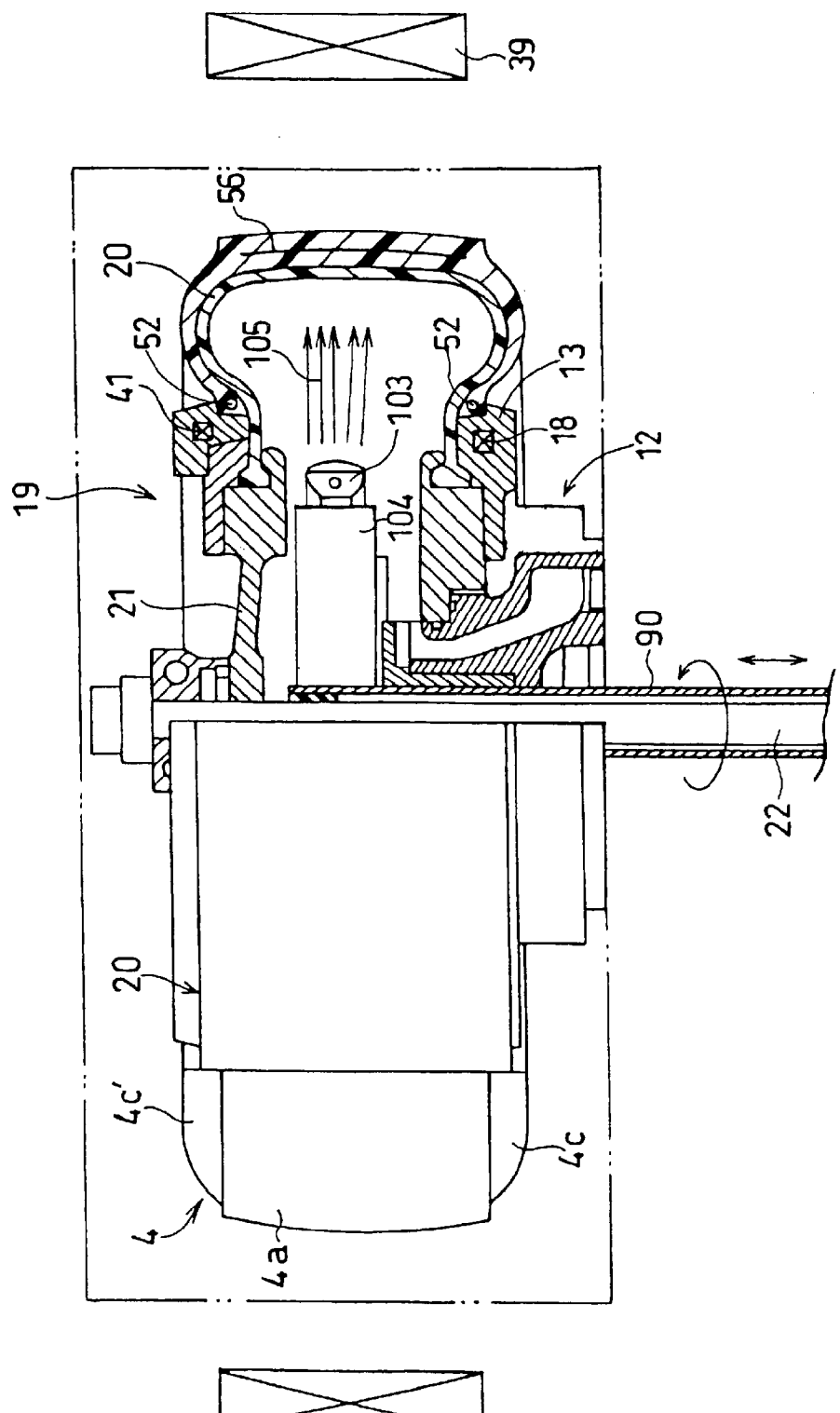
FIG. 7 is an explanatory view showing a state of carrying out press molding.
Figure 8:
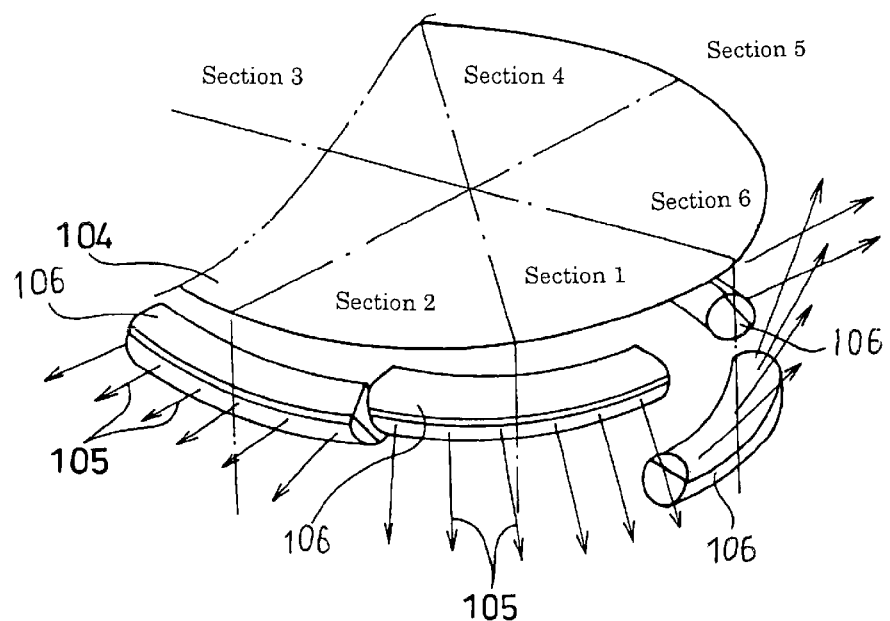
FIG. 8 is an explanatory view showing a mounting state of a directional lamp.
Figure 9:
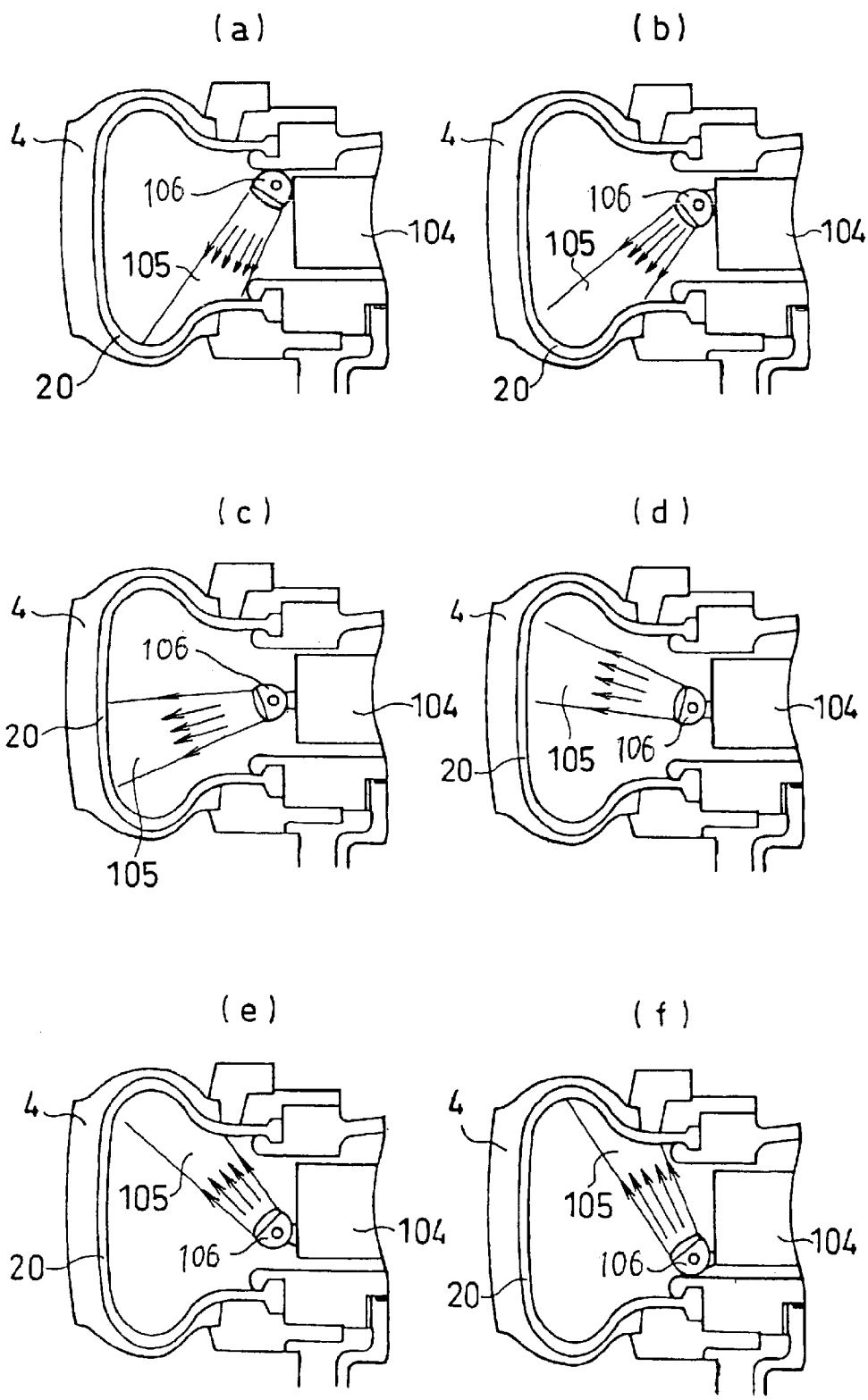
FIG. 9 is an explanatory view showing a mounting state of directional lamps in FIG. 8 in section.

That is, as shown in FIG. 7, the heat generation means has a disk-shaped lamp support member 104 laterally installed on the upper end part of the first cylindrical member 90, and a plurality of directional lamps 106 provided in the side peripheral surface of the lamp support member 104 to emit light 105 in a predetermined direction to heat an irradiated part. As shown in FIG. 8, each directional lamp 106 is formed to be a convex curve shape so as to be arranged on the same circumference about the rotational center, the emitting direction of the light 105 being set to a direction different in up and down. Preferably, emitting directions of a number of directional lamps 106 are set to a direction of the wall-thickness part so that the directional lamps 106 may principally heat the wall-thickness part such as the bead parts 4c, 4c' and the tread part 4a of the green tire 4. FIGS. 9(*a*) to (*f*) show, in section, mounting states of the directional lamps shown in FIG. 8. FIGS. (*a*), (*b*), (*c*), (*d*), (*e*), and (*f*) in FIG. 9 correspond to sections 1, 2, 3, 4, 5, and 6 in FIG. 8, respectively.

What is claimed is:

1. A center mechanism of a tire press, comprising:
   a lower ring;
   an upper ring;
   a center post, said center post being vertically movably extended through a center part of said lower ring to vertically move said upper ring with respect to said lower ring;
   heating means; and
   moving means capable of moving said heating means to a suitable position independently of vertical movement of said center post, said heating means being arranged, when a tire is held between said lower ring and said upper ring, at a position capable of heating the inside of the tire.

2. The center mechanism of a tire press according to claim 1 further comprising a tubular member movably inserted over said center post, said heating means being mounted on said tubular member.

3. The center mechanism of a tire press according to claim 2 wherein said heating means is a heater provided to be wound around the whole periphery of a partial region of said tubular member.

4. The center mechanism of a tire press according to claim 2 wherein said moving means comprises a first driving mechanism for vertically moving said tubular member.

5. The center mechanism of a tire press according to claim 4 wherein said moving means further comprises a second driving mechanism for rotating said tubular member about said center post.

6. The center mechanism of a tire press according to claim 2 wherein said heating means is a directional lamp set so as to emit light in a predetermined direction to apply a heat.

7. A tire press comprising:
   a mold, and a green tire mounted within said mold by clamping said mold when subjected to press processing;
   mold heating means for heating said mold;
   a bladder, said bladder being placed in close contact with an inner wall surface of a green tire when subjected to press processing;
   means for supplying a heating medium into said bladder;
   a lower ring, said lower ring being connected to a lower part of said bladder;
   an upper ring, said upper ring being connected to an upper part of said bladder;
   a center post, said center post being vertically movably extended through a center part of said lower ring, and vertically moving said upper ring with respect to said lower ring;
   heating means; and
   moving means capable of moving said heating means to a suitable position independently of vertical movement of said center post, said heating means being arranged at a position capable of heating the inside of said bladder when a tire is held between said lower ring and said upper ring.

8. The tire press according to claim 7 further comprising:
   a high frequency power source; and
   a heating coil supplied with power from said high frequency power source.

9. The tire press according to claim 7 further comprising:
   a tubular member movably inserted over said center post, said heating means being mounted on said tubular member.

10. The tire press according to claim 9 wherein said heating means is a heater provided to be wound about the whole periphery of a partial region of said tubular member.

11. The tire press according to claim 9 wherein said moving means comprises a first driving mechanism for vertically moving said tubular member.

12. The tire press according to claim 11 wherein said moving means comprises a second driving mechanism for rotating said tubular member about said center post.

13. The tire press according to claim 9 wherein said heating means is a directional lamp set so as to emit light in a predetermined direction to apply a heat.

14. A tire press comprising a center mechanism of a tire press according to claim 1.

* * * * *